United States Patent
Rezzi et al.

[11] Patent Number: 6,043,943
[45] Date of Patent: Mar. 28, 2000

[54] ASYMMETRY CORRECTION FOR A READ HEAD

[75] Inventors: Francesco Rezzi, Santa Clara; Giuseppe Patti, San Jose, both of Calif.

[73] Assignee: STMicroelectronics, Inc., Carrollton, Tex.

[21] Appl. No.: 08/846,782

[22] Filed: Apr. 30, 1997

Related U.S. Application Data

[63] Continuation-in-part of application No. 08/778,417, Dec. 31, 1996, abandoned.

[51] Int. Cl.[7] .................................................... G11B 5/09
[52] U.S. Cl. .............................. 360/46; 360/67; 327/553; 330/254; 330/278
[58] Field of Search ................................ 360/67, 65, 46; 327/553; 330/254, 278, 282

[56] References Cited

U.S. PATENT DOCUMENTS

| | | | |
|---|---|---|---|
| 3,916,180 | 10/1975 | Turtle | 708/807 |
| 5,157,559 | 10/1992 | Gleason et al. | 360/46 |
| 5,412,518 | 5/1995 | Christner et al. | 360/66 |
| 5,418,660 | 5/1995 | Sato et al. | 360/65 |

OTHER PUBLICATIONS

Millmon et al, Microelectronics, 2nd Ed., © Dec. 1987, pp. 760–762.
Abstract of Japanese Pat. No. 408083403 A, Published Mar. 26, 1996, to Toshiba.
Abstract of Japanese Pat. No. 407202575A, Published Aug. 4, 1995, to Tujitsu.
Grebene, Alan, "Monolithic Waveform Generation," *IEEE Spectrum*, pp. 378–384, Apr. 1972.
Gray and Meyer, Analysis and Design of Analog Integrated Circuits, John Wiley & Sons, Toronto, 1977, pp. 562–563.

*Primary Examiner*—Alan Faber
*Attorney, Agent, or Firm*—David V. Carlson; Theodore E. Galanthay; Lisa K. Jorgenson

[57] ABSTRACT

A method and a circuit for correcting asymmetry in a response signal generated by a magneto-resistive head. The magneto-resistive head generates a response signal to transmit digital information read from a magnetic media storage device. The asymmetry is corrected in a negative feedback manner by squaring an output signal, modulating the squared output signal, and subtracting the modulated squared output signal from the response signal to generate the output signal. The circuit employs a differential amplifier as an input stage and a Gilbert multiplier circuit to square the output signal.

38 Claims, 3 Drawing Sheets

ASYMMETRY CORRECTION FOR A READ HEAD

CROSS-REFERENCE TO RELATED APPLICATION

This application is a continuation in part of U.S. patent application Ser. No. 08/778,417, filed Dec. 31, 1996, now abandoned.

TECHNICAL FIELD

This invention relates to response signals generated by a read head in a high-performance media storage device, and more particularly, to a method and a circuit for correcting asymmetry in a response signal generated by a magneto-resistive head.

BACKGROUND OF THE INVENTION

Read heads are commonly used to retrieve data from storage media in high-performance data storage devices. For example, magneto-resistive heads are used to read data from hard disk drives and from floppy disks in computer related applications. A magneto-resistive head reads digital information from a magnetic storage media and transfers the digital information as a differential voltage signal, also called a response signal, to a read channel that retrieves the digital information. The digital information is stored on the media as a series of magnetic flux changes. A typical response to an isolated magnetic flux change on the media is an electric pulse whose polarity depends on the direction of the magnetic flux change.

Magneto-resistive heads often produce an asymmetric response signal, or, in other words, a response signal with an asymmetry. The asymmetry is defined as the difference between the amplitude of positive and negative peaks in the asymmetric response signal normalized by their average value, which is expressed according to equation (1):

$$asymmetry = \frac{|peak P| - |peak N|}{\frac{|peak P| + |peak N|}{2}} \quad (1)$$

where peakP and peakN denote the amplitude of positive and negative isolated pulses in the asymmetric response signal. Typical values for the asymmetry range from 10% to 20% even though higher values (up to 30%) can be measured.

An asymmetric response signal produced by a magneto-resistive head may be represented mathematically by a function g(t). A symmetrical response signal, which represents the digital information without the asymmetry, may be represented mathematically by a function h(t) whose nominal peak amplitude is one. A simplified model for the asymmetry in the asymmetric response signal g(t) is quadratic in nature, and can be expressed according to equation (2):

$$g(t) = h(t) + c_{asym} h^2(t) \quad (2)$$

According to equation (1) the coefficient $c_{asym}$ is half the value of the asymmetry.

In conventional data retrieval systems, the asymmetry of the response signal is compensated for by targeting different thresholds for positive and negative pulses. This is usually accomplished in a digital domain after the response signal has been sampled and digitized. This method, however, doesn't compensate for harmonic distortion that is present in the original asymmetric response signal as it appears clearly in equation (2).

SUMMARY OF THE INVENTION

According to principles of the present invention, an inventive filtering circuit for generating an output signal from an asymmetric input signal is provided. An input stage receives the asymmetric input signal and generates the output signal. A squaring circuit having a modulation stage receives the output signal and generates a modulated squared output signal. An output of the squaring circuit is connected to a subtraction terminal of the input stage for subtracting the modulated squared output signal from the asymmetric input signal to generate the output signal.

The basic operation is as follows. An asymmetrical input signal is obtained from a read head. A modulated signal is subtracted from the asymmetrical input signal to generate an output signal. The output signal is multiplied by itself to generate a squared output signal. The squared output signal is multiplied by a selected ratio to generate the modulated signal, which is subtracted from the input signal, as previously mentioned.

The circuit and the method according to principles of the present invention provide for a harmonic correction of the asymmetric input signal without introducing any offset components or additional distortion. The circuit also consumes very little power.

DETAILED DESCRIPTION OF THE INVENTION

Figure 1:
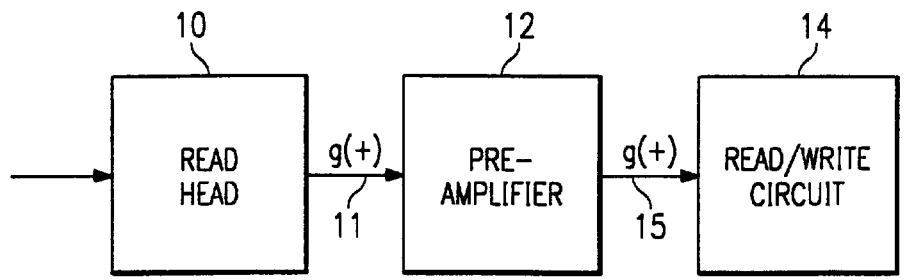
FIG. 1 is a block diagram of a system for reading data from a magnetic storage media according to an embodiment of the invention.

A system for reading data from a magnetic storage media in a disk drive system, and more particularly for reading data from a rotating magnetic disk, is shown in FIG. 1. A read head 10 is positioned over a track in the rotating magnetic disk (not shown) and retrieves data according to magnetic flux changes in the surface of the disk. The read head 10 converts the magnetic flux changes into an asymmetric response signal g(t) which is amplified by a pre-amplifier 12 and processed by a read/write circuit 14.

Figure 2:
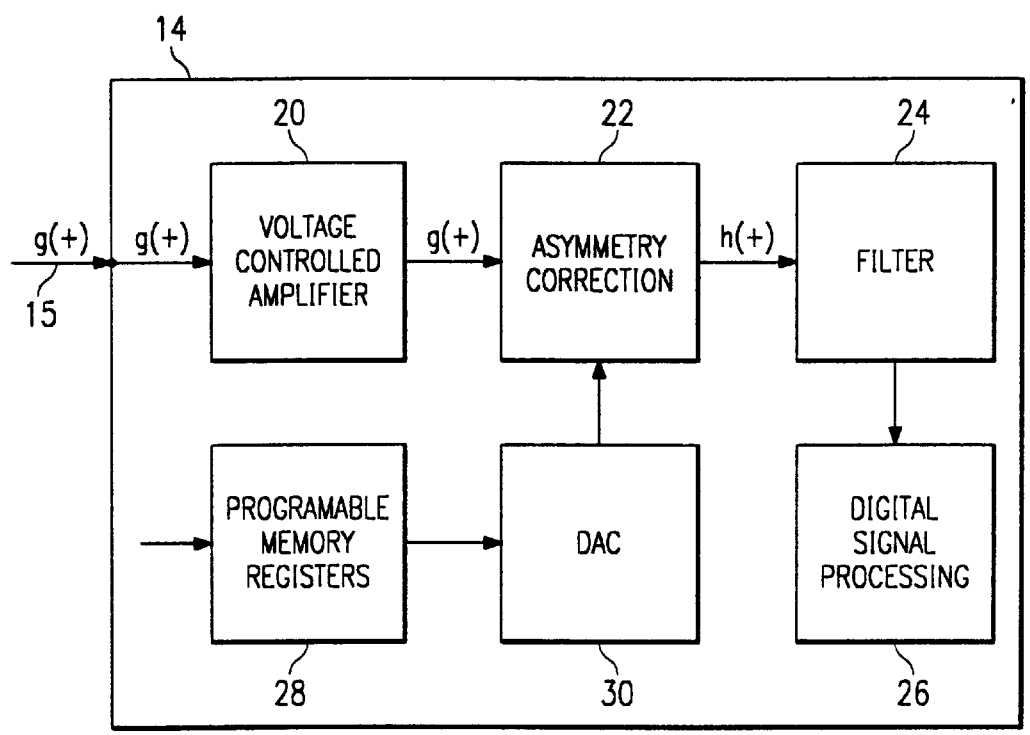
FIG. 2 is a block diagram of a read/write circuit according to an embodiment of the invention.

The read/write circuit 14 is shown in detail in FIG. 2. The asymmetric response signal g(t) is amplified by a voltage controlled amplifier 20, and the asymmetry in the asymmetric response signal g(t) is corrected by an asymmetry correction circuit 22 which produces a symmetrical response signal h(t). The symmetrical response signal h(t) is passed through a filter circuit 24 and is then processed by a digital signal processing circuit 26.

Individual read heads, such as the read head 10, produce asymmetric response signals g(t) having different amounts of asymmetry. The asymmetry correction circuit 22 must be calibrated according to the particular read head to which it is connected during operation. The calibration is accomplished in the read/write circuit 14 by using a calibration value which is selected in the following manner. During assembly of the disk drive system a particular read head 10 is connected to the asymmetry correction circuit 22 in the manner shown in FIGS. 1 and 2. The read head 10 is then exposed over a magnetic media and generates the asymmetric response signal g(t). The signal g(t) is provided to the read/write circuit 14 and a signal h(t) is produced. Prior to calibration, the signal h(t) has no correction, that is, it is asymmetrical. The output h(t) is monitored using well known circuits to sense the presence of asymmetry in the signal. The amount of the asymmetrical correction is changed while the output h(t) is monitored until a signal that is generally symmetrical is obtained. The calibration value is selected to calibrate the asymmetry correction circuit 22 to correct the asymmetric response signal g(t) produced by the read head 10.

The calibration value is stored in the circuit. For example, it can be stored in a set of 4-bit programmable memory registers 28 which hold numerical values used by the disk drive system. The calibration value is converted by a digital-to-analog converter (DAC) 30 and supplied as an analog calibration signal to the asymmetry correction circuit 22 during operation of the circuit. The registers 28 may be dedicated permanent memory such as EPROM or EEPROM registers which are programmed during assembly of the disk drive system. The registers 28 may also be volatile memory devices such as DRAM or SRAM in which case the calibration value is provided by a microcontroller (not shown) during operation of the disk drive system.

The disk drive system may also have more than one read head controlled by a single read/write circuit 14, in which case the selected read head during a particular read operation is matched with its particular calibration value. Calibration values for each of the read heads are obtained as indicated above for the single read head. These are obtained one at a time and stored. The stored value is matched to the identity of the read head. The respective values are stored by the microcontroller either in a memory or as part of a microcontroller code. The microcontroller provides a calibration value to the DAC 30 which is associated with the selected read head so that the asymmetry correction circuit 22 can correct the asymmetric response signal g(t) produced by the selected read head. If a subsequent read operation requires a different read head, the microcontroller will provide a new calibration value to the registers 28 corresponding to the newly selected read head.

The asymmetry correction circuit shown as block 22 in FIG. 2 will now be more particularly described.

A symmetrical response signal h(t) can be recovered from an asymmetric response signal g(t) generated by a magneto-resistive head according to equation (3):

$$h(t)=g(t)-c_{asym}h^2(t) \quad (3)$$

Equation (3) is a rearrangement of equation (2). Solving equation (3) for h(t) yields equation (4):

$$h(t) = \frac{-1 + \sqrt{1 + 4c_{asym}g(t)}}{2c_{asym}} \quad (4)$$

Equation (4) is the only solution for equation (3) which accommodates an initial condition of g(t)=0 when h(t)=0. The initial condition of g(t)=0 when h(t)=0 holds for a magneto-resistive head because the head always starts from a state of rest. In other words, a magneto-resistive head always begins operating from a state in which it is not transmitting any signals.

The solution to equation (3), which is expressed in equation (4), is valid when the asymmetric response signal g(t) is small. If the asymmetric response signal g(t) is too wide in the negative direction, then the solution shown in equation (4) may not converge. Practically, this situation will not occur because the asymmetric response signal g(t) is limited by the voltage controlled amplifier 20. The circuit is therefore never driven by an asymmetric response signal g(t) which is sufficiently negative to cause the equation (4) to diverge. In alternative embodiments of the invention, any conventional voltage limiter circuit would be sufficient to prevent such an occurrence.

Figure 3:
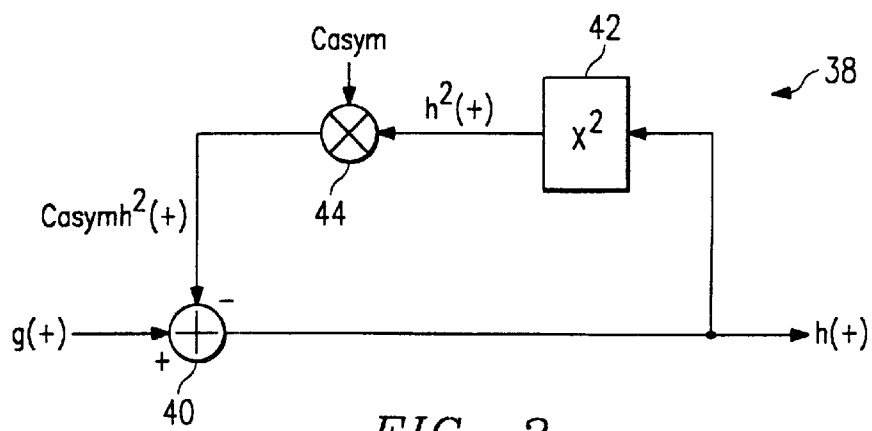
FIG. 3 is a block diagram of an asymmetry correction circuit for correcting an asymmetric response signal generated by a magneto-resistive head according to an embodiment of the invention.

A block diagram of an asymmetry correction circuit 38 according to an embodiment of the invention is shown in FIG. 3. An asymmetric response signal g(t) is input to the circuit at an input stage 40. A symmetrical response signal h(t) is produced by the input stage 40. The symmetrical response signal h(t) is squared to produce a squared signal $h^2(t)$ in a feedback loop having a squaring circuit 42. The squared signal $h^2(t)$ is then multiplied by the term $c_{asym}$, defined in equation (2), in a modulation stage 44. The modulation stage 44 provides a modulated squared symmetrical response signal $c_{asym}h^2(t)$ which is then subtracted from the asymmetric response signal g(t) at the input stage 40. The input stage 40 thereby generates the symmetrical response signal h(t).

In the operation of the circuit 38, there is a delay in the response of the feedback loop to the input of the asymmetric response signal g(t). Therefore, the symmetrical response signal h(t) must be in phase with the asymmetric response signal g(t) when the magneto-resistive head begins operating for the circuit to produce an undistorted output. As stated above, the initial condition of g(t)=0 when h(t)=0 holds for the circuit in real time operation. If the environment is of the type that spurious h(t) signals are likely to occur before the actual start of operation of the magneto-resistive head, a reset switch is placed at the output of the circuit 38 to force the initial condition of h(0)=0.

Figure 4:
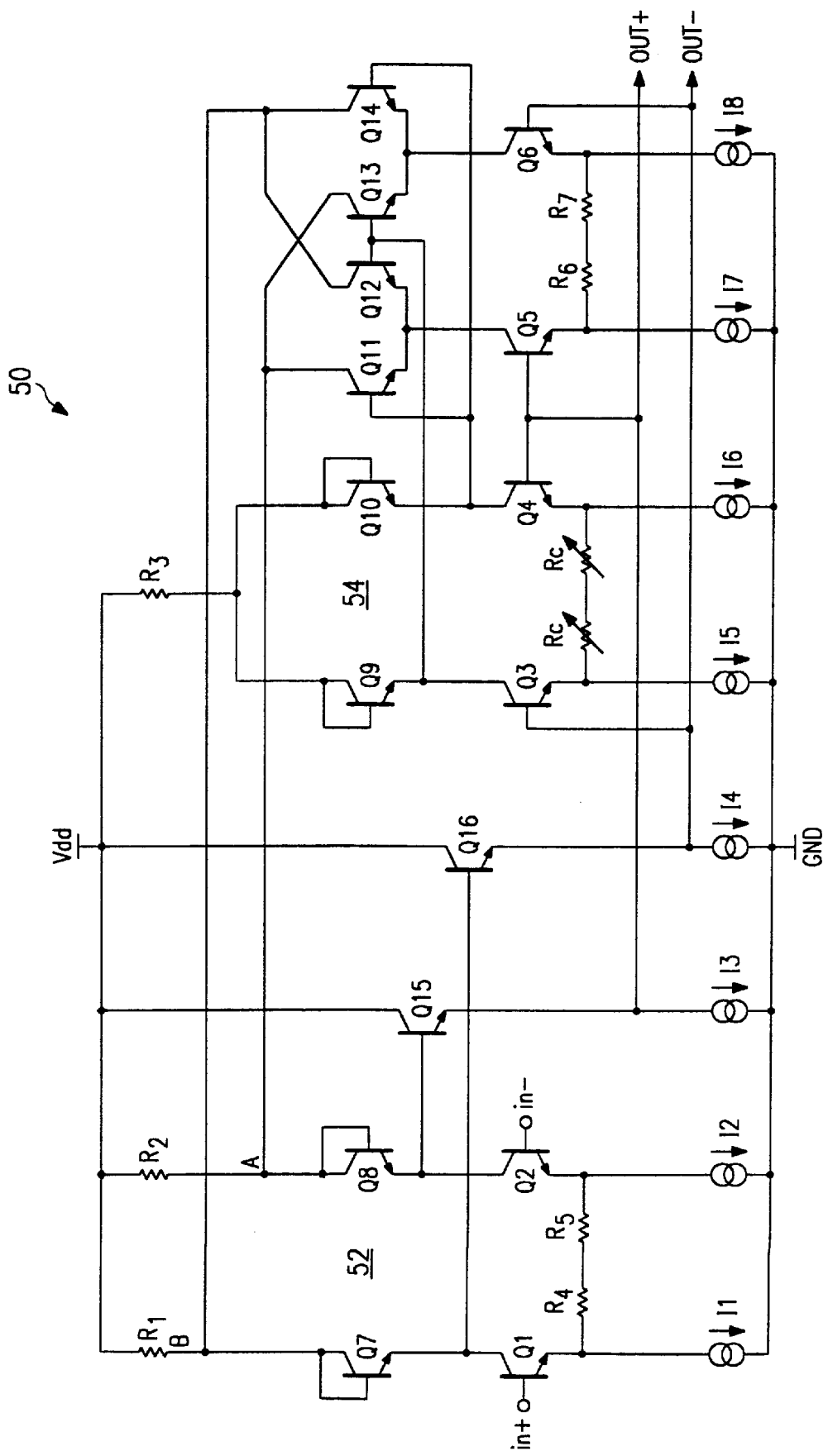
FIG. 4 is an electrical schematic diagram of an asymmetry correction circuit according to a first embodiment of the invention.

An asymmetry correction circuit 50 according to a first embodiment of the invention is shown in FIG. 4. The left-hand side of the circuit 50, which includes a group of transistors identified as Q1, Q2, Q7, and Q8, and a pair of buffer transistors Q15 and Q16, is a differential amplifier 52 which serves as an input stage for the circuit 50.

According to the first embodiment of the invention shown in FIG. 4, the asymmetric response signal g(t) is a differential input signal comprised of two signals in+ and in−. As will be appreciated, in some circuits the asymmetric response signal g(t) is a single voltage signal in which information is stored relative to a ground voltage potential. In the circuit 50, the difference in voltage between the in+ and in− signals represents the asymmetric response signal g(t). The use of two signals whose voltage difference is an output signal of a magneto-resistive head is well known in conventional disk drive systems. Accordingly, the differential amplifier 52 receives the asymmetric response signal g(t) as a differential input signal. The differential amplifier 52 generates a symmetrical response signal h(t) which is a differential output signal comprised of the difference in voltage between two signals out+ and out−.

A base of the transistor Q1 receives a positive side of the differential input signal in+ and a base of the transistor Q2 receives a negative side of the differential input signal in−. Two resistors R4 and R5 are connected in series between an emitter of the transistor Q1 and an emitter of the transistor Q2. A first current source I1 is connected between the emitter of the transistor Q1 and a ground voltage reference, and a second current source I2 is connected between the emitter of the transistor Q2 and the ground voltage reference. An emitter of the transistor Q7 is connected to a collector of the transistor Q1 and to a base of the transistor Q16. An emitter of the transistor Q8 is connected to a collector of the transistor Q2 and to a base of the transistor Q15. A base and a collector of the transistor Q7 are connected together and a base and a collector of the transistor Q8 are connected together. The transistors Q7 and Q8 are diode connected to provide a controlled voltage drop in the differential amplifier 52 which is necessary to maintain the rest of the transistors in the circuit 50 in an unsaturated operating condition. A first load resistor $R_1$ is connected between a voltage source $V_{dd}$ and the collector of the transistor Q7, and a second load resistor $R_2$ is connected between the voltage source $V_{dd}$ and the collector of the transistor Q8. Both of the transistors Q15 and Q16 have collectors which are connected directly to the voltage source $V_{dd}$. An emitter of the transistor Q15 is connected to a third current source I3, and an emitter of the transistor Q16 is connected to a fourth current source I4. The third and fourth current sources I3 and I4 are connected to the ground voltage reference.

The differential amplifier 52 is a unity gain amplifier with a pair of buffer transistors Q15 and Q16 which produces the differential output signal from the differential input signal applied between the bases of the transistors Q1 and Q2. In the circuit 50, the differential output signal is produced between the emitters of the transistors Q15 and Q16, respectively. The emitter of the transistor Q15 produces a positive side out+ and the emitter of the transistor Q16 produces a negative side out− of the differential output signal. The transistors Q15 and Q16 are voltage sensing transistors which operate in an unsaturated region. The voltage applied to the base of the transistor Q15 is reproduced at the emitter of the transistor Q15, and the voltage applied to the base of the transistor Q16 is reproduced at the emitter of the transistor Q16. The transistors Q15 and Q16 buffer the differential output signal of the differential amplifier 52 and ensure DC compatibility in the circuit 50.

A group of npn transistors identified as Q3, Q4, Q5, Q6, Q9, Q10, Q11, Q12, Q13, and Q14, along with several resistors and current sources, make up a Gilbert multiplier circuit 54. Beginning on the left-hand side of the Gilbert multiplier circuit 54, a base of the transistor Q3 and a base of the transistor Q4 form a first differential input port. A pair of adjustable resistors $R_c$ are connected in series between an emitter of the transistor Q3 and an emitter of the transistor Q4. A fifth current source I5 is connected between the emitter of the transistor Q3 and the ground voltage reference. A sixth current source I6 is connected between the emitter of the transistor Q4 and the ground voltage reference.

An emitter of the transistor Q9 is connected to a collector of the transistor Q3, and an emitter of the transistor Q10 is connected to a collector of the transistor Q4. The transistors Q9 and Q10 are diode connected. A base and a collector of the transistor Q9 are connected together and a base and a collector of the transistor Q10 are connected together. The collectors of the transistors Q9 and Q10 are connected together to a second end of a biasing resistor $R_3$, and a first end of the biasing resistor $R_3$ is connected to the voltage source $V_{dd}$.

A base of the transistor Q5 and a base of the transistor Q6 form a second differential input port for the Gilbert multiplier circuit 54. Two resistors $R_6$ and $R_7$ are connected in series between an emitter of the transistor Q5 and an emitter of the transistor Q6. A seventh current source I7 is connected between the emitter of the transistor Q5 and the ground voltage reference, and an eighth current source I8 is connected between the emitter of the transistor Q6 and the ground voltage reference. A collector of the transistor Q5 is connected to a pair of emitters of the transistors Q11 and Q12, respectively, and a collector of the transistor Q6 is connected to a pair of emitters of the transistors Q13 and Q14, respectively. A base of each of the transistors Q11 and Q14 is connected to the collector of the transistor Q4, and a base of each of the transistors Q12 and Q13 is connected to the collector of the transistor Q3. A collector of the transistor Q11 and a collector of the transistor Q13 are connected together to form a positive differential output node of the Gilbert multiplier circuit 54. A collector of the transistor Q12 and a collector of the transistor Q14 are connected together to form a negative differential output node of the Gilbert multiplier circuit 54.

The Gilbert multiplier circuit 54 multiplies a first differential signal applied between the bases of the transistors Q3 and Q4 with a second differential signal applied between the bases of the transistors Q5 and Q6 to generate a differential output signal between the connected collectors of the transistors Q11 and Q13 and the connected collectors of the transistors Q12 and Q14.

The sign of the correction for the asymmetry in the asymmetric response signal g(t) may be changed by exchanging the collector outputs of one of the pairs of transistors Q3 and Q4, Q5 and Q6, or Q11 and Q14. This may be accomplished with any conventional switch such as a BJT or a MOS transistor (not shown).

The Gilbert multiplier circuit 54 provides a gain which is inversely proportional to the resistance of the adjustable resistors $R_c$. As the resistance of one or both of the resistors $R_c$ is increased, the gain of the Gilbert multiplier circuit 54 decreases, and as the resistance of one or both of the resistors $R_c$ is decreased, the gain of the Gilbert multiplier circuit 54 increases. The adjustable resistors $R_c$ provide for a modulation of the differential output signal generated by the Gilbert multiplier circuit 54. Each of the adjustable resistors $R_c$ may be called an adjustable modulating impedance.

The adjustable resistors $R_c$ in the circuit 50 may be programmable resistors having a resistance value selected by the DAC 30 according to the calibration value stored in one of the registers 28 shown in FIG. 2. The calibration value may be selected during assembly of the disk drive system according to an analysis of the asymmetric response signal g(t) produced by the read head. In an alternative embodiment, the adjustable resistors $R_c$ may be trimmed during assembly of the read/write circuit 14.

The Gilbert multiplier circuit 54 is coupled to the differential amplifier 52 in the following manner. The collectors of the transistors Q11 and Q13 are connected to the collector of the transistor Q8 at a node A. The collectors of the transistors Q12 and Q14 are connected to the collector of the transistor Q7 at a node B. The differential output signal generated by the Gilbert multiplier circuit 54 is thereby coupled to the differential amplifier 52 between the nodes A and B.

The differential amplifier 52 is in turn coupled to the Gilbert multiplier circuit 54 in the following manner. The emitter of the transistor Q15 is connected to the bases of each of the transistors Q4 and Q5. Likewise, the emitter of the transistor Q16 is connected to the bases of each of the transistors Q3 and Q6. The differential output signal produced by the differential amplifier 52 is thereby applied to both of the differential input ports of the Gilbert multiplier circuit 54.

The current sources I1–I8 described herein and shown in FIG. 4 are similarly constructed according to one of many well known designs. The current sources I1, I2, I5, I6, I7, and I8 each draw an equal amount of current I to the ground voltage reference. The current sources I3 and I4 each draw half the amount of current, I/2, that the other current sources do.

The operation of the circuit 50 will now be described. The differential input signal is received by the differential amplifier 52 between the bases of the transistors Q1 and Q2. The differential amplifier 52 produces the differential output signal between the emitters of the transistors Q15 and Q16. The differential output signal is supplied to the first differential input port between the bases of the transistors Q3 and Q4 and to the second differential input port between the bases of the transistors Q5 and Q6 of the Gilbert multiplier circuit. The Gilbert multiplier circuit produces a squared signal between the nodes A and B, and the squared signal is modulated by the adjustable resistors $R_c$. The connection at the nodes A and B in the circuit 50 results in a subtraction of current from the differential amplifier 52 to the Gilbert multiplier circuit 54. The subtracted current flows from the voltage source $V_{dd}$ through the resistors R1 and R2 to the nodes B and A, respectively, and then to the Gilbert multiplier circuit 54. The remaining unsubtracted current flows to the transistors Q7 and Q8. The subtracted current flow increases the voltage drop across the resistors R1 and R2 which reduces the differential output signal produced by the differential amplifier 52. The nodes A and B may be called subtraction terminals.

The operation of the circuit 50 may be related to the circuit 38 shown in FIG. 3 in the following way. An asymmetric response signal g(t) is input to the differential amplifier 52 between the bases of the transistors Q1 and Q2. The differential amplifier 52 produces the symmetrical response signal h(t) between the emitters of the transistors Q15 and Q16. The symmetrical response signal h(t) is input to the Gilbert multiplier circuit 54 which both modulates and squares the symmetrical response signal h(t). The Gilbert multiplier circuit 54 produces the modulated squared symmetrical response signal $c_{asym}h^2(t)$ according to the resistance provided by the adjustable resistors $R_c$. The modulated squared symmetrical response signal $c_{asym}h^2(t)$ is applied between the nodes A and B to subtract current from the differential amplifier 52. The circuit 50 thereby subtracts the modulated squared symmetrical response signal $c_{asym}h^2(t)$ from the asymmetric response signal g(t) to produce the symmetrical response signal h(t).

The elements of the circuit 50 correspond to the elements in the circuit 38 shown in FIG. 3 in the following way. The input stage 40 corresponds to the differential amplifier 52, and the squaring circuit 42 corresponds to the Gilbert multiplier circuit 54. The modulation stage 44 corresponds to the adjustable resistors $R_c$ in the Gilbert multiplier circuit 54.

Figure 5:
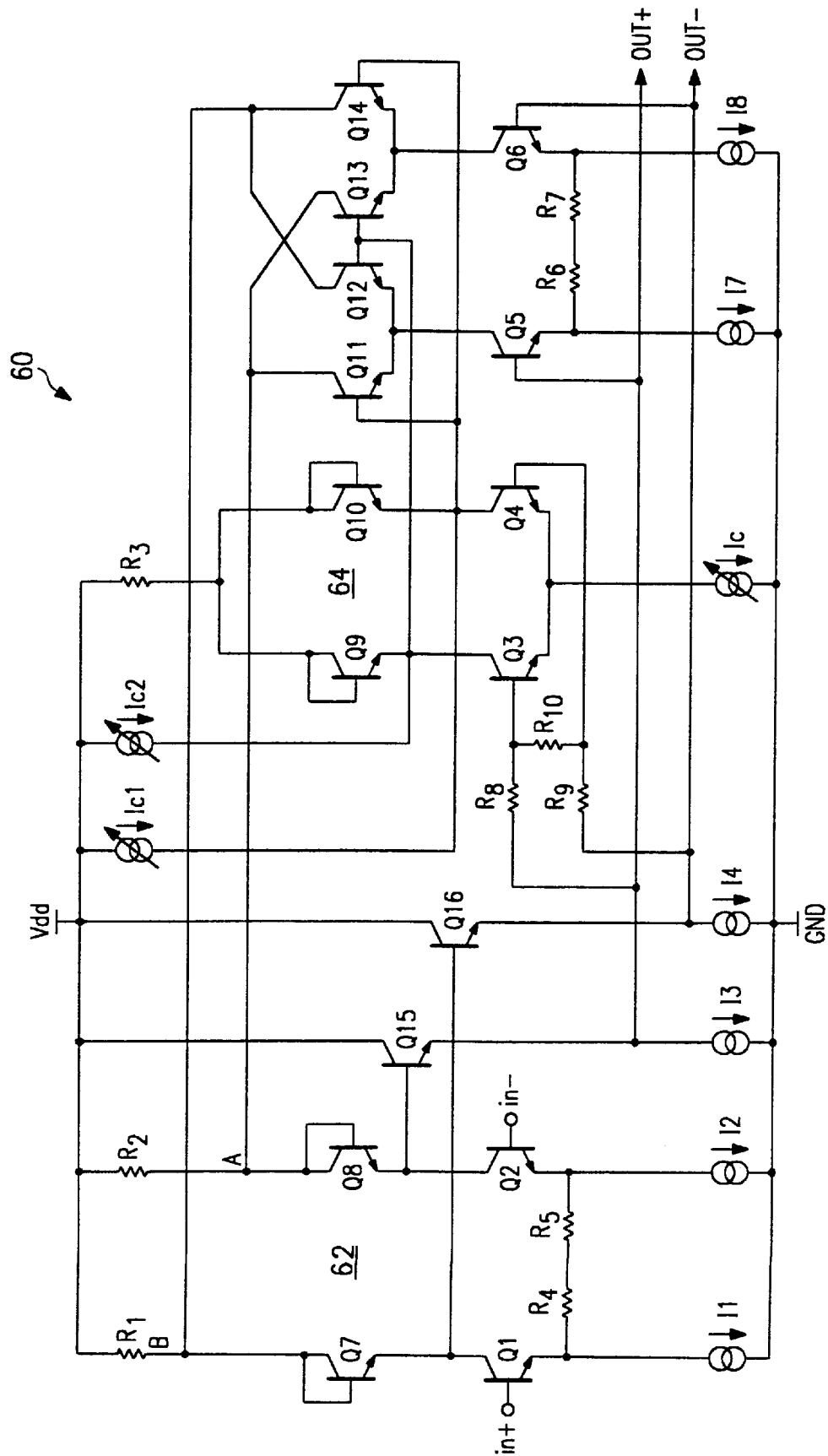
FIG. 5 is an electrical schematic diagram of an asymmetry correction circuit according to a second embodiment of the invention.

An asymmetry correction circuit 60 according to a second embodiment of the invention is shown in FIG. 5. The circuit 60 is similar to the circuit 50 shown in FIG. 4, and elements common to both circuits 50 and 60 have the same reference numerals.

The circuit 60 shown in FIG. 5 includes a differential amplifier 62 and a Gilbert multiplier circuit 64 and is different from the circuit 50 shown in FIG. 4 in the following ways. The current sources I5 and I6 and the adjustable resistors $R_c$ are not present and the emitters of the transistors Q3 and Q4 are connected together. An adjustable current source Ic is connected between the emitters of the transistors Q3 and Q4 and the ground voltage reference. An adjustable current source Ic1 is connected between the collector of the transistor Q4 and the voltage source $V_{dd}$, and an adjustable current source Ic2 is connected between the collector of the transistor Q3 and the voltage source $V_{dd}$.

A voltage divider circuit made up of resistors $R_8$, $R_9$, and $R_{10}$ is interposed between the emitters of the transistors Q15 and Q16 and the first differential input port of the Gilbert multiplier circuit 64. The base of the transistor Q3 and the base of transistor Q4, forming the first differential input port, receive a differential voltage signal from the voltage divider circuit. The resistor $R_{10}$ is connected between the bases of the transistors Q3 and Q4. The resistor $R_8$ is connected between the base of the transistor Q3 and the emitter of the transistor Q15. The resistor $R_9$ is connected between the base of the transistor Q4 and the emitter of the transistor Q16. Also, the bases of the transistors Q3 and Q4 are not connected to the bases of the transistors Q6 and Q5, respectively. The resistors $R_8$ and $R_9$ have the same resistance value, and the voltage divider circuit attenuates an incoming differential voltage signal by a factor of ten. All of the remaining connections between the elements of the circuit 60 shown in FIG. 5 are identical to the corresponding connections in the circuit 50 shown in FIG. 4.

The gain of the Gilbert multiplier circuit 64 is governed by the adjustable current sources Ic, Ic1, and Ic2. The current in each of the adjustable current sources Ic, Ic1, and Ic2 is controlled by the DAC 30 with the calibration signal according to the calibration value stored in one of the registers 28 shown in FIG. 2. The current in the adjustable current source Ic is regulated between 0 and a maximum value, Icmax. The current in each of the adjustable current sources Ic1 and Ic2 is regulated to be equal to one-half of the current in the adjustable current source Ic. Adjustable current sources per se are well known in the art and any one of the many known adjustable current sources may be used for Sources Ic, Ic1 and Ic2.

The operation of the circuit 60 shown in FIG. 5 is similar to the operation of the circuit 50 shown in FIG. 4, but there are some differences. The voltage divider circuit receives the differential output signal from the emitters of the transistors Q15 and Q16 and attenuates this signal by a factor of ten. The attenuated differential output signal is applied to the first differential input port between the bases of the transistors Q3 and Q4. The Gilbert multiplier circuit produces the squared signal between the nodes A and B which is modulated according to the current in the adjustable current sources Ic, Ic1, and Ic2. The application of the modulated squared signal between the nodes A and B results in a subtraction of current from the differential amplifier 62 which reduces the differential output signal produced by the differential amplifier 62.

The structure and the operation of the circuit 60 shown in FIG. 5 is related to the circuit shown in FIG. 3 in a manner similar to the relation between the FIGS. 3 and 4, one difference being that the modulation stage 44 corresponds to the adjustable current sources Ic, Ic1, and Ic2. The selection of current in the adjustable current sources Ic, Ic1, and Ic2 regulates the generation of the modulated squared symmetrical response signal $c_{asym}h^2(t)$ by the Gilbert multiplier circuit 64.

The circuit 50 according to the first embodiment of the invention shown in FIG. 4 provides a correction for an asymmetric response signal g(t) over a wide range of frequencies. At some higher frequencies, for example frequencies greater than 10 MHz, parasitic capacitance effects occur which may introduce non-linearities into the circuit 50. The circuit 60 according to the second embodiment of the invention shown in FIG. 5 is designed to reduce the parasitic capacitance effects and provides for correction of the asymmetric response signal g(t) over a wide range of frequencies including frequencies well above 10 MHz.

An advantage of an asymmetry correction circuit according to either of the first and second embodiments of the invention is that it allows the recovery of the original symmetrical response signal h(t) without introducing any additional distortion or offset in the signal.

A method and an apparatus for correcting asymmetry in a response signal generated by a magneto-resistive head has been described. The details of well-known circuits such as current sources, disk drive systems, and the like have not been shown in detail in order not to unnecessarily obscure the invention. In addition, it will be appreciated that, although several embodiments of the invention have been described above for purposes of illustration, various modifications may be made without deviating from the spirit and scope of the invention. For example, the invention may be applied to optical read heads and their output signals. A Gilbert multiplier circuit and a differential amplifier circuit have been described as elements in the asymmetry correction circuit. However, those skilled in the art will appreciate that any number of well-known multiplier circuits and amplifier circuits could be employed according to the present invention. Numerous variations are well within the scope of this invention. Accordingly, the invention is not limited except as by the appended claims.

What is claimed is:

1. An asymmetry correction circuit for generating an output signal from an asymmetric input signal, the asymmetric input signal being produced by a magneto-resistive head, the circuit comprising:

an input stage receiving an asymmetric input signal and generating an output signal at an output, the input stage having a subtraction terminal; and a squaring circuit having a modulation stage, the squaring circuit having an input connected to the output of the input stage to receive the output signal and having an output connected to the modulation stage and to the subtraction terminal of the input stage to provide a modulated squared output signal to the subtraction terminal for subtraction from the asymmetric input signal.

2. The asymmetry correction circuit of claim 1 wherein the input stage comprises a differential amplifier having a differential input, a differential output, and a subtraction terminal.

3. The asymmetry correction circuit of claim 1 wherein the squaring circuit comprises a Gilbert multiplier circuit having two differential input ports, a differential output port, and a modulation stage, both of the differential input ports receiving the output signal, the differential output port being coupled to the subtraction terminal of the input stage, the Gilbert multiplier circuit generating the modulated squared output signal at the differential output port.

4. The asymmetry correction circuit of claim 1 wherein the modulation stage comprises an adjustable modulating impedance.

5. The asymmetry correction circuit of claim 4 wherein the adjustable modulating impedance comprises at least one trimmed resistor.

6. The asymmetry correction circuit of claim 4 wherein the adjustable modulating impedance comprises a programmable resistor having a resistance value, the resistance value being selected by a digital-to-analog converter in response to a calibration value stored in a register.

7. The asymmetry correction circuit of claim 1 wherein the squaring circuit comprises a Gilbert multiplier circuit having first and second differential input ports, a differential output port, and a modulation stage, the first differential input port receiving the output signal, the second differential input port receiving an attenuated output signal, the differential output port being coupled to the subtraction terminal of the input stage, the Gilbert multiplier circuit generating the modulated squared output signal at the differential output port.

8. The asymmetry correction circuit of claim 7 wherein the modulation stage is comprised of at least one controlled current source.

9. The asymmetry correction circuit of claim 8 wherein the modulation stage is comprised of a plurality of controlled current sources each generating a current, the current generated by each controlled current source being controlled by a digital-to-analog converter based on a calibration value stored in a register.

10. An asymmetry correction circuit for generating an output signal from an asymmetric input signal produced by a magneto-resistive head, comprising:

a multiplier circuit having a plurality of input terminals, an output terminal, and a modulation element; and an amplifier having an input and an output, the output of the amplifier being connected to the input terminals of the multiplier circuit to square the output signal by multiplying the output signal by itself, the output of the amplifier being connected to a circuit output port, the amplifier further having a subtraction terminal connected to the output terminal of the multiplier circuit to receive a modulated squared output signal from the modulation element.

11. The asymmetry correction circuit of claim 10 wherein the multiplier circuit comprises a Gilbert multiplier circuit.

12. The asymmetry correction circuit of claim 10 wherein the modulation element comprises an adjustable modulating impedance.

13. The asymmetry correction circuit of claim 12 wherein the adjustable modulating impedance comprises an adjustable resistance.

14. The asymmetry correction circuit of claim 13 wherein the adjustable resistance comprises at least one trimmed resistor.

15. The asymmetry correction circuit of claim 12 wherein the adjustable modulating impedance comprises a programmable resistor having a resistance value, the resistance value being selected by a digital-to-analog converter in response to a calibration value stored in a register.

16. The asymmetry correction circuit of claim 10 wherein the multiplier circuit comprises a differential multiplier circuit having two differential input terminals and one differential output terminal.

17. The asymmetry correction circuit of claim 16 wherein the amplifier comprises a differential amplifier having a differential input and a differential output, the differential output of the differential amplifier being connected to both differential input terminals of the differential multiplier circuit.

18. The asymmetry correction circuit of claim 10 wherein the modulation element is comprised of at least one controlled current source.

19. The asymmetry correction circuit of claim 18 wherein the modulation element is comprised of a plurality of controlled current sources each generating a current, the current generated by each controlled current source being controlled by a digital-to-analog converter based on a calibration value stored in a register.

20. The asymmetry correction circuit of claim 10, further comprising a voltage divider circuit interposed between the output of the amplifier and one of the input terminals of the multiplier circuit.

21. The asymmetry correction circuit of claim 10 wherein the input of the amplifier receives the asymmetric input signal and the amplifier generates an output signal at the output of the amplifier, the output signal being applied to the input terminals of the multiplier circuit, the multiplier circuit generating the modulated squared output signal at the output terminal of the multiplier circuit, the modulated squared output signal being applied to the subtraction terminal of the amplifier.

22. A system for reading data from a storage media and generating an information signal, comprising:

a read head reading data from the storage media and generating a first signal in response to the data;

a pre-amplifier receiving the first signal and amplifying the first signal to generate a second signal;

a voltage controlled amplifier receiving the second signal and amplifying the second signal to generate a third signal;

a register storing a calibration value;

a digital-to-analog converter connected to the register to receive the calibration value, the digital-to-analog converter generating a calibration signal based on the calibration value;

an asymmetry correction circuit receiving the third signal and the calibration signal and correcting an asymmetry in the third signal according to the calibration signal to generate a fourth signal;

a filter receiving the fourth signal and filtering the fourth signal to generate a fifth signal; and a digital signal processing circuit receiving the fifth signal and processing the fifth signal into the information signal.

23. The system of claim 22 wherein the asymmetry correction circuit comprises:

an input stage receiving the third signal and generating the fourth signal at an output, the input stage having a subtraction terminal; and a squaring circuit having a modulation stage and receiving the calibration signal, the squaring circuit having an input connected to the output of the input stage for receiving the fourth signal and having an output connected to the subtraction terminal of the input stage, the squaring circuit generating a modulated squared fourth signal according to the calibration signal and providing the modulated squared fourth signal to the subtraction terminal for subtraction from the third signal.

24. A method for generating an output signal from an asymmetric input signal produced by a magneto-resistive head, the asymmetric input signal having positive peaks and negative peaks, the method comprising:

squaring the output signal by multiplying the output signal with itself in a multiplier circuit to obtain a squared output signal;

generating a modulated signal by multiplying the squared output signal by a selected ratio in a modulating circuit; and subtracting the modulated signal from the asymmetric input signal to generate the output signal.

25. The method of claim 24 wherein the multiplier circuit is a Gilbert multiplier circuit.

26. The method of claim 24, further comprising:

calculating a ratio that is a difference between the positive peaks and the negative peaks of the asymmetric input signal normalized by the average value of the positive peaks and the negative peaks; and dividing the ratio in half to obtain the selected ratio.

27. The method of claim 24, further comprising forcing the asymmetric input signal and the output signal to a ground voltage reference as an initial step.

28. The method of claim 24 wherein subtracting the modulated signal from the asymmetric input signal comprises drawing a current from a subtraction terminal in an amplifier circuit.

29. A method comprising:

providing an asymmetric input signal produced by a magneto-resistive head, the asymmetric input signal having positive and negative peaks;

subtracting a modulated signal from the input signal to generate a first signal;

generating a squared first signal by multiplying the first signal with itself; and modulating the squared first signal according to a selected ratio to generate the modulated signal.

30. The method of claim 29 wherein modulating the squared first signal comprises multiplying the squared first signal by the selected ratio.

31. The method of claim 29 wherein modulating the squared first signal comprises selecting an impedance value in a Gilbert multiplier circuit.

32. The method of claim 29 wherein modulating the squared first signal comprises regulating one or more variable current sources dynamically with a control logic circuit.

33. The method of claim 29 wherein modulating the squared first signal comprises selecting a current generated by each of a plurality of controlled current generators in a Gilbert multiplier circuit.

34. A method for reading data from a storage media with a plurality of read heads to generate an information signal, comprising:

selecting a first read head;

storing a first calibration value for the first read head in a register;

reading data from the storage media with the first read head and generating a first signal from the first read head in response to the data;

amplifying the first signal to generate a second signal;

subtracting a first modulated signal from the second signal to generate a third signal;

generating a squared third signal by multiplying the third signal with itself;

modulating the squared third signal according to the first calibration value to generate the first modulated signal;

filtering the third signal to generate a fourth signal; and processing the fourth signal to generate the information signal.

35. The method of claim 34, further comprising:

selecting a second read head;

storing a second calibration value for the second read head in the register;

reading data from the storage media with the second read head and generating a fifth signal from the second read head in response to the data;

amplifying the fifth signal to generate a sixth signal;

subtracting a second modulated signal from the sixth signal to generate a seventh signal;

generating a squared seventh signal by multiplying the seventh signal with itself;

modulating the squared seventh signal according to the second calibration value to generate the second modulated signal;

filtering the seventh signal to generate an eighth signal; and processing the eighth signal to generate the information signal.

36. A method comprising:

subtracting a modulated signal from an input signal to generate a first signal;

generating a squared first signal by multiplying the first signal with itself; and modulating the squared first signal by a selected ratio to generate the modulated signal, wherein modulating the squared first signal comprises selecting an impedance value in a Gilbert multiplier circuit.

37. A method comprising:

subtracting a modulated signal from an input signal to generate a first signal;

generating a squared first signal by multiplying the first signal with itself; and modulating the squared first signal by a selected ratio to generate the modulated signal, wherein modulating the squared first signal comprises regulating one or more variable current sources dynamically with a control logic circuit.

38. A method comprising:

subtracting a modulated signal from an input signal to generate a first signal;

generating a squared first signal by multiplying the first signal with itself; and modulating the squared first signal by a selected ratio to generate the modulated signal, wherein modulating the squared first signal comprises selecting a current generated by each of a plurality of controlled current generators in a Gilbert multiplier circuit.

* * * * *